United States Patent [19]

Shinohara et al.

[11] Patent Number: 4,537,479
[45] Date of Patent: Aug. 27, 1985

[54] PROGRESSIVE MULTIFOCAL OPHTHALMIC LENS

[75] Inventors: Toshihide Shinohara; Sakiho Okazaki, both of Suwa, Japan

[73] Assignee: Kabushiki Kaisha Suwa Seikosha, Tokyo, Japan

[21] Appl. No.: 648,913

[22] Filed: Sep. 10, 1984

[30] Foreign Application Priority Data

Sep. 16, 1983 [JP] Japan .................................. 58-170647
Apr. 6, 1984 [JP] Japan .................................. 59-68648
Jun. 7, 1984 [JP] Japan .................................. 59-117210
Jun. 7, 1984 [JP] Japan .................................. 59-117211

[51] Int. Cl.³ .............................................. G02C 7/06
[52] U.S. Cl. .................................................. 351/169
[58] Field of Search ......... 351/159, 168, 169, 170–172

[56] References Cited

U.S. PATENT DOCUMENTS 4,315,673 2/1982 Guilino et al. ...................... 351/169

FOREIGN PATENT DOCUMENTS 57-76521 5/1982 Japan .................................. 351/169

Primary Examiner—John K. Corbin
Assistant Examiner—Scott J. Sugarman
Attorney, Agent, or Firm—Blum Kaplan Friedman Silberman & Beran

[57] ABSTRACT

Progressive multifocal ophthalmic lenses are provided having a far vision viewing zone, a near vision viewing zone and an intermediate vision viewing zone therebetween. A principal meridian curve extends vertically through the far, intermediate and near vision viewing zones. The surface power along the principal meridian curve in the intermediate vision viewing zone varies progressively. The sizes of the zones and configuration of the zones are set by predetermined conditions and equations. The construction provides improved lenses for use in activities such as sports, driving, shopping and the like.

12 Claims, 39 Drawing Figures

PROGRESSIVE MULTIFOCAL OPHTHALMIC LENS

BACKGROUND OF THE INVENTION

The present invention is directed generally to progressive multifocal ophthalmic lenses and, in particular, to a new configuration for the refractive surface of a progressive multifocal ophthalmic lens.

Progressive multifocal ophthalmic lenses have been developed to compensate for the decreased ability of the eye to control the crystalline lens in an aged person. A number of types of such progressive multifocal ophthalmic lenses have been disclosed, including those disclosed in U.S. Pat. No. 3,687,528, U.S. Pat. No. 3,910,691, U.S. Pat. No. 4,056,311, Canadian Patent No. 1,152,369, U.S. Pat. No. 4,240,719, U.S. Pat. No. 4,315,673, U.S. Pat. No. 4,253,747 and British Patent No. 2,092,772A. The present inventors are named as inventors in U.S. patent application Ser. No. 180,765, now abandoned and U.S. patent application Ser. No. 327,288, which also disclose different types of progressive multifocal lenses.

The basic construction of progressive multifocal ophthalmic lenses disclosed in the above patents or patent applications is common, as described below.

A progressive multifocal ophthalmic lens generally includes a segment for viewing distant objects and a segment for viewing nearby objects at the upper and the lower portions of the lens, respectively, and a third segment for viewing intermediate objects between these two segments. These three segments are called "the far vision viewing zone" (hereinafter referred to as "the far zone"), "the rear vision viewing zone" (hereinafter referred to as "the near zone") and "the intermediate vision viewing zone" (hereinafter referred to as "the intermediate zone"), respectively, and are divided into left and right parts by a principal meridian curve which extends vertically. In at least the intermediate zone, the surface power varies progressively. The demarcations of these segments are made to be smooth so that the demarcations are not perceived by the wearer of the lens. These three segments are usually provided on the convex surface of the two refractive surfaces, convex and concave, constituting the lens. The other surface of the lens is then provided with a spherical or toric surface designed specifically to correct farsightedness, nearsightedness, astigmatism and the like of the wearer.

The basic construction of the conventional progressive multifocal ophthalmic lens is described in more detail with reference to the drawings.

FIG. 1 is a plan view of the refractive surface of a lens body 10 for a progressive multifocal lens, showing the arrangement of the different segments described above. In FIG. 1, the far zone is designated at 1, the intermediate zone is designated at 2, and the near zone is designated at 3, and M is the principal meridian curve.

FIG. 2 illustrates the variation of the surface power along the principal meridian curve M. The surface power is expressed by:

surface power $= C \times (N-1)$ where C is the curvature in the units of m (meters), and N is the refractive index of the lens material, and the units of the surface power is diopter (hereinafter referred to as D).

As shown by FIGS. 1 and 2, the surface power along the principal meridian curve above the point A, that is, in the far zone, is D1, and that below the point B, that is, in the near zone, is D2. Between points A and B, the surface power progressively increases from D1 to D2. The difference between D1 and D2 (D2−D1) is referred to as the additional power, which additional power is usually between 0.5 to 3.5D. In FIG. 2, the surface powers in the far zone and the near zone, respectively, are constant as an example. However, as will be described later, there is another example in which the surface power in at least one of the far and the near zones progressively varies. In such a case, D1 and D2 are not defined, and consequently, the additional power of the lens cannot be evaluated. Accordingly, in order to determine the additional power of the lens of this kind, the reference surface power is defined in each zone. Hereinafter, D1 and D2 represent the far-zone reference focal power and the near-zone reference focal power, respectively.

In FIG. 1, the length L between points A and B is referred to as the length of the intermediate zone or the length of the progressive portion.

As described above, in the progressive multifocal ophthalmic lens, since a plurality of separate segments of different focal powers are combined into one smooth curved surface, at least the intermediate zone is inevitably aspherical. As a result, astigmatism appears in the peripheral portion of the lens. In addition, since the magnification of images seen through each portion of the refractive surface is different, distortion of the images may occur. These defects are illustrated in FIGS. 3 and 4.

FIG. 3 is a contour of the astigmatism for explaining the distribution of the astigmatism of the lens of FIG. 1. Herein, the astigmatism is obtained by coverting the difference in the principal curvatures on the refractive surface into the differences in the surface power. That is, since the refractive surface of the progressive multifocal ophthalmic lens is aspherical, the curvature at a certain point (or a minute plane) is different depending upon the direction chosen. The maximum and minimum of the curvatures in the various directions at a certain point are called the principal curvatures. Given that the principal curvatures expressed in units of $m^{-1}$ are C1, C2, astigmatism is obtained by the formula:

astigmatism $= |C1-C2| \times (N-1)$ and the units are D. Astigmatism is perceived by the wearer of the lens as the blurring of the images, and astigmatism exceeding 0.5D usually causes the wearer to become dizzy. In FIG. 3, the denser the hatched lines are, the larger the astigmatism is, and consequently, the more severe the blurring of the images is.

The principal meridian curve usually forms an umbilical curve. The umbilical curve is a series of points where the principal curvatures are equal, that is, of minute spherical surfaces, along which the astigmatism is essentially 0. Even if the principal meridian curve does not form an umbilical curve, the astigmatism along the principal meridian curve is made to be smallest.

FIG. 4 illustrates distortion of the images of the square grid when viewed through the progressive multifocal ophthalmic lens of FIG. 1. The difference in the magnification in each portion of the refractive surface causes distortion of the images of the square grid, in which the vertical lines laterally expand into the downward direction with respect to a center line 41 corresponding to the principal meridian curve of the lens, and the horizontal lines skew downward in the peripheral portions. Such a skew distortion of the images is not only perceived as a distortion of the vision by the wearer, but also causes shaking of the images when the objects relatively move with respect to the line of vision of the wearer, such as when the wearer follows an object with his eyes or watches something while turning his head, resulting in the wearer becoming dizzy and nauseous.

In making spectacles having progressive multifocal lenses, the lens body 10 is cut into the internal eye shape. In the cutting process, it is required to define the fitting point and the insetting of lenses to adapt for the convergence.

The fitting point is the position on the refractive surface of the lens through which the line of vision of the wearer passes when he looks at the far vision in the natural position and is sometimes called "the eye point." Generally, the fitting point is defined on the principal meridian curve between point A and a point 2 to 3 mm above A. In FIG. 3, the fitting point F is defined on point A.

The convergence means that the line of vision moves more inside when looking at nearby objects than when looking at distant objects. Accordingly, when making spectacles, the lenses are required to be arranged so that the distance between the points B of both lenses is shorter than the distance between the points A of both lenses. In other words, the lenses are inset. In general, the lens as shown by FIG. 3 is designed so that the left and the right half are symmetrical with respect to the principal meridian curve M and is used for spectacles by rotating by an angle of about 10°. For example, presuming that the lens of FIG. 3 is viewed from the side of the convex surface of the lens, the lens is used as a spectacle lens for the left eye under the condition that the horizontal line H (the line orthogonal to the principal meridian curve M) is rotated by about 10° to the line H' (hereinafter referred to as the horizontal line when glazed H'). Accordingly, the configuration of the lens for spectacles after the cutting process is shown by 11. In FIG. 3, only the configuration of the lens for the left eye is described but not for the right eye. When preparing the spectacle lens for the right eye, the horizontal line H is rotated into the opposite direction to the horizontal line when glazed H' for the left eye.

There is another type of progressive multifocal ophthalmic lens, as shown by FIG. 5, in which the left and the right halves of the refractive surface thereof are asymmetrical. In the case of FIG. 5, the principal meridian curve M is inclined in the middle portion, and the horizontal line H of the lens need not be rotated for use in spectacles. The lens of FIG. 5 is designed for the left eye and 11 is the configuration of the lens after the cutting process. In designing this type of ophthalmic lens for the right eye, the principal meridian curve M between the points A and B is inclined in the opposite direction from the direction shown in FIG. 5.

The above-described progressive multifocal ophthalmic lenses are only a few examples of the conventional lenses, and there are many other lenses having the same basic construction and still giving the wearer different wearing sensations. The fact that there are so many kinds of progressive multifocal ophthalmic lenses demonstrates that the ideal design for a progressive multifocal ophthalmic lens is difficult to realize. In other words, in designing a progressive multifocal ophthalmic lens, there is a significant problem that if a characteristic is improved, another characteristic is adversely affected.

Among many characteristics of the progressive multifocal ophthalmic lens affecting each other, those which restrict the design of lenses most considerably are called "the dynamic vision" and "the static vision."

"The dynamic vision" is the vision in the case where the object moves relative to the line of vision, such as when viewing a moving object or watching something while turning one's head, and "the static vision" is the vision in the case where the line of vision and the object are both almost still. With respect to the design of progressive multifocal ophthalmic lenses, the dynamic vision is affected mainly by distortion of the images, and the smaller the distortion of images is, the better the dynamic vision is. On the other hand, the static vision is affected mainly by astigmatism, and the smaller the astigmatism on the total refractive surface of the lens or the larger the area of the region having the small astigmatism (for example, the region having the astigmatism is no more than 0.5D) is, the better the static vision is.

If the region having smaller astigmatism is designed to be larger in order to obtain good static vision, the magnification changes abruptly around the region, that is, in the lateral portions of the lens, and thus the distortion of images becomes severe, deteriorating the dynamic vision. In contrast, if the dynamic vision is improved, the area of the region with the small astigmatism in the far and near zones is reduced, and the static vision is affected.

Accordingly, the balance of the dynamic vision and the static vision is considered to be one of the most important factors in designing the progressive multifocal ophthalmic lens. It can be said that the difference in design of the progressive multifocal ophthalmic lens is ultimately the difference in degree of giving priority to either the dynamic or the static vision. In some lenses, as a result of thinking more highly of the improvement of the static vision than of the dynamic vision, the refractive surface in the far zone as a whole is made to be spherical, and a large spherical part is also provided in the center of the near zone. By this structure, while the static vision is improved, the distortion of images is very severe in the lateral portions of the intermediate and near zones, and the dynamic vision is deteriorated. In another lens, as a result of thinking more highly of the improvement of the dynamic vision than of the static vision, the far and near zones are both provided with aspherical surfaces in order to reduce the distortion of the images as a whole. Accordingly, the region with the small astigmatism becomes narrow, and the static vision is affected.

In spite of a difference in the priority of the dynamic and the static visions as mentioned above, in the conventional progressive multifocal ophthalmic lenses, designers have had one common basic conception. That is, they have pursued the design of the progressive multifocal lens which is available in various circumstances, i.e., which is used for various purposes. In general, the progressive multifocal ophthalmic lens has been designed for the presbyopic, and while the priorities of the far, intermediate and near zones are almost equal, the area of the near zone tends to be larger than that of the other zones.

With respect to a certain specific use, the conventional progressive multifocal lens for the various purposes is not necessarily most suitable, and it is often very inconvenient, for example, when engaging in sports (such as golf), shopping, driving a car and the like. The requirements in designing of progressive multifocal ophthalmic lens for use in such conditions as above may not suffice in the conventional progressive multifocal lens for the various purposes mentioned above. Some of the lenses with a small additional power (0.5 to 1.25D) do have appropriate characteristics (it is natural because if the additional power is small, the astigmatism can be essentially reduced). However, although moderate or large additional powers are required in the progressive multifocal ophthalmic lenses, the conventional lenses with such large additional powers do not have aptitude for use in the above circumstances.

Accordingly, improved multifocal ophthalmic lenses are desired.

SUMMARY OF THE INVENTION

Generally speaking, in accordance with the present invention, a progressive multifocal ophthalmic lens, including first and second refractive surfaces which face each other, is provided. The first refractive surface has upper and lower portions and includes a far vision viewing zone defined in the upper portion for viewing mainly distant objects, a near vision viewing zone in the lower portion for viewing mainly nearby objects and an intermediate vision viewing zone for viewing mainly intermediate objects between said far and near vision viewing zones. The intermediate vision viewing zone includes an intermediate vision viewing zone central portion, and the near vision viewing zone includes a near vision viewing zone central portion. The first refractive surface includes a principal meridian curve extending vertically in the general center of the far, intermediate and near vision viewing zones. The surface power along the principal meridian curve in the intermediate vision viewing zone progressively increases from a far vision viewing zone reference focal power (D1 diopter) to a near vision viewing zone reference focal power (D2 diopter). An additional power Ad [Ad=D2−D1] of the first refractive surface being about 1.5 diopter or more.

The intermediate vision viewing zone central portion and the near vision viewing zone central portion extend on opposite sides of the principal meridian curve. The principal curvatures at each arbitrary point on the first refractive surface are C1 and C2, with each point on the first refractive surface in the intermediate vision viewing zone central portion satisfying the condition:

$$|C1-C2| \leq 1/(N-1)(m^{-1}).$$

Each point on the first refractive surface in the near vision viewing zone central portion satisfies the conditions:

$$|C1 - C2| \leq 1/(N - 1)(m^{-1})$$

$$\frac{D_2 - 0.5}{N - 1} \leq \frac{C_1 + C_2}{2} \leq \frac{D_2 + 0.5}{N - 1} \ (m^{-1}),$$

where N is the refractive index of the lens material. The minimum width of the intermediate vision viewing zone central portion and the maximum width of the near vision viewing zone central portion are S(mm) and W(mm) respectively. The minimum width S and the maximum width W satisfy the conditions:

$$W \leq 30/A \ (mm)$$

$$W \leq 1.5 \times S \ (mm),$$

wherein A is the value of the additional power Ad expressed in units of diopter, and the gradient of the variation of the surface power at each arbitrary point along the principal meridian curve is G(diopter/mm). Every point along the principal meridian curve in the intermediate vision viewing zone satisfies the condition:

$$G \leq Ad/18 \ (diopter/mm),$$

where Ad is the additional power in units of diopter.

Accordingly, it is an object of the present invention to provide an improved progressive multifocal ophthalmic lens.

Another object of the present invention is to provide a progressive multifocal ophthalmic lens for use in activities such as sports, shopping, driving a car and the like.

A further object of the present invention is to provide a progressive multifocal ophthalmic lens in which a wide field of far vision is obtained and shaking of images is substantially reduced.

A still further object of the present invention is to provide a progressive multifocal ophthalmic lens with improved far vision viewing.

Still other objects and advantages of the invention will in part be obvious and will in part be apparent from the specification.

The invention accordingly comprises the features of construction, combination of elements and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
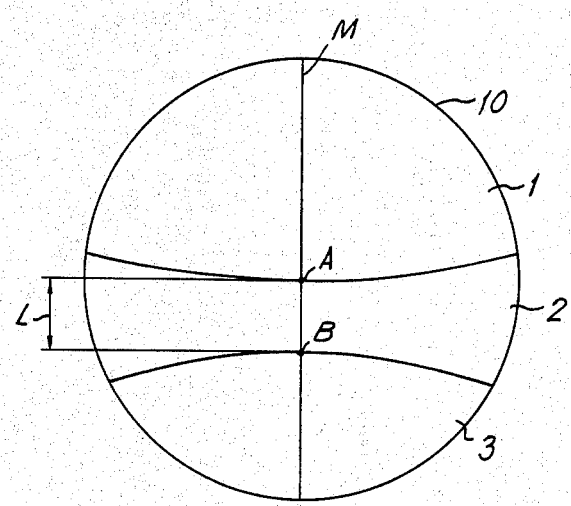
FIG. 1 is a schematic plan view of the convex refractive surface of a progressive multifocal ophthalmic lens constructed in accordance with the prior art.
Figure 2:
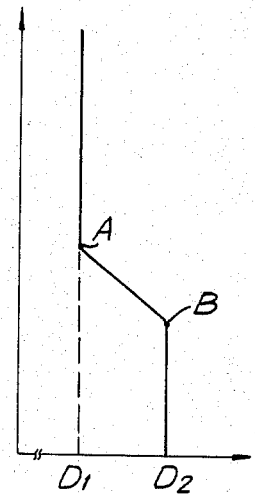
FIG. 2 is a graph depicting the focal power variation along the principal meridian curve of the progressive multifocal ophthalmic lens of FIG. 1 in accordance with the prior art.

In order to obtain an optimal progressive multifocal lens for use in sports, shopping or driving a car, it is necessary to change the conventional point of view to choose either the dynamic vision or the static vision. Instead, the qualities of both dynamic and static visions are kept equally high in the far and the intermediate zones at a slight expense to the quality of both dynamic and static visions in the near zone. Requirements for the three zones of the progressive multifocal lens to be designed in accordance with the above conceptions are explained below.

The requirement for the far zone is that even when the wearer watches an object to the side without moving his head, the blurring, distortion and shaking of images are not produced. It is preferable that such blurring, distortion and shaking of images are not perceived when the wearer watches an object lying in the lateral portion a little lower than the horizontal line. (The lateral portion a little lower than the horizontal line can be regarded as a part of the intermediate zone though the requirement for that portion is the same.) For example, when swinging a club in golf, the far vision which is wide and with a small shaking of the image is essential. When driving a car, the larger the far vision with the small blurring and distortion is, the better. Herein, since the peripheral portion of the lens is not used frequently and is out of the gazing vision, the blurring and distortion of images seen through the peripheral portions can be accepted to a certain degree.

In the intermediate zone, it is required that the width of the region through which the image is viewed without blurring is large and the distortion and shaking of images are small in the lateral portions. The intermediate zone especially plays an important role when one views the weave of grass on the putting green in golfing, the display of the meters on a car, the price and the like on the labels of goods in shop windows and so on.

With respect to the near zone, the width of the region where the blurring of images does not occur should be at a minimum acceptable value. Of course, the larger the width of the region is, the better. However, such a region in the near zone is reduced in order to improve the characteristics of the far and intermediate zones. In engaging in golf, driving a car, shopping and so on, the near zone of the progressive multifocal lens is not very significant, and it is rare that the near zone is used for a long time. In playing golf, for example, the characteristic of the near zone is fully acceptable only if the wearer can keep score.

As mentioned before, the above requirements for each zone are not met in any of the conventional progressive multifocal ophthalmic lenses. The characteristics of the actual progressive multifocal ophthalmic lens are described below. The characteristics of lenses of this kind vary with the additional power. The following description is for a lens with the additional power of 2.0D. Also, the values of the astigmatism, the focal power and so on in the description are based on the results of experiments using a lensmeter with an opening having a diameter of 5 mm.

First, the characteristic of the far zone is evaluated along the contour of astigmatism of 1.0D. Herein, the region with an astigmatism of no more than 1.0D is considered to be the region through which the blurring or distortion of images is not perceived very much. Generally, the upper limit of such a region as above is 0.5D. However, the experiment in the preparatory stages of this invention demonstrated that in the design in which the astigmatism varies progressively, the upper limit of the region where "the blurring or distortion of images is not very much perceived" is preferably 1.0D rather than 0.5D, considering the actual feeling of the wearer as explained below. Accordingly, the evaluation of the characteristic here is with respect to the contour of the astigmatism of 1.0D.

Figure 3:
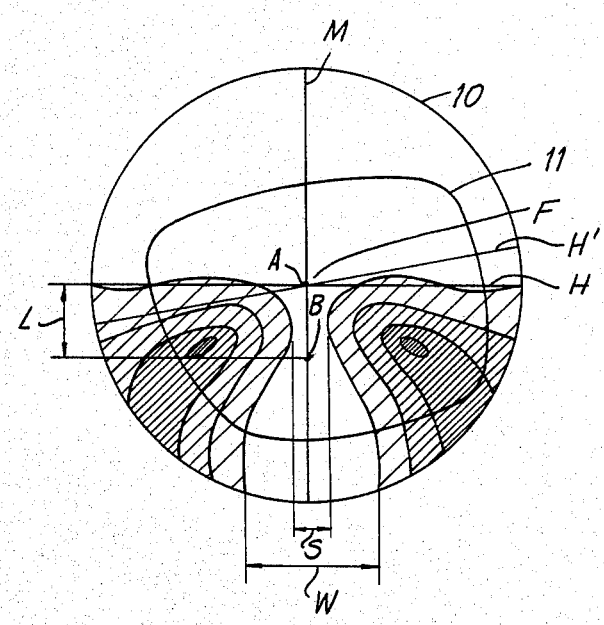
FIG. 3 is a schematic plan view depicting the distribution of astigmatism of a progressive multifocal ophthalmic lens constructed in accordance with the prior art.
Figure 5:
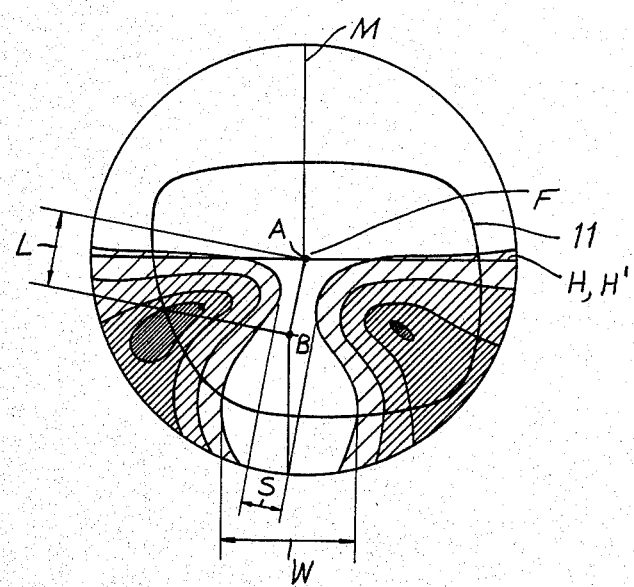
FIG. 5 is a schematic plan view illustrating the distribution of astigmatism of a progressive multifocal ophthalmic lens constructed in accordance with the prior art.

In FIGS. 3 and 5, the region without hatched lines has astigmatism of no more than 1.0D. In the lens of FIG. 3, which is designed to be bilateral-symmetrical, the contour of 1.0D lies 0° to 10° upward of the horizontal line H. In preparing this lens for spectacles, the lens is rotated about 10° for insetting as mentioned above. Accordingly, after insetting, the contour of 1.0D in the portion of the lens at the side of the nose (i.e., the left-hand side of the lens of FIG. 3) lies 10° to 20° upward of the horizontal line when glazed H'. In this portion, the wearer views the object lying aside laterally through the region with a large astigmatism, and consequently the image blurs. The lens of FIG. 5, which is designed to be asymmetrical, is not required to be rotated for insetting. So the contour of 1.0D lies 0° to 10° upward of the horizontal line H (H'). Thus, the vision through the lens of FIG. 5 is slightly improved over that of FIG. 3, though it is still far less than satisfactory. Besides, the lens of FIG. 5 has a defect in that astigmatism or distortion and shaking of the images increases in the portion from the lower part of the far zone to the upper part of the intermediate zone at the side of the nose (the left-hand side of FIG. 5). The defect as above is also present in the lens of a type which is bilateral-symmetrical and in which the static vision is emphasized (for example, the lens in which the whole portion above the horizontal line H is provided with a spherical surface).

Second, the characteristic of the intermediate zone is evaluated in terms of the minimum width S of the region with astigmatism no more than 1.0D. In the conventional progressive multifocal ophthalmic lens, the minimum width S is 3 to 8 mm, and in most cases, S is 5 to 6 mm. In defining the optimal value of S, the case where the wearer views an object lying in the position where the hand is reached out (e.g., when reading the meter in driving a car) is considered as an example. In such a case as above, it is desired that an area as wide as 20 to 30 cm can be clearly viewed at a distance of about 60 cm. Converting this into the width S, the optimal value of S is defined to about 8 to 12 mm, and thus the width S of the conventional progressive multifocal lens is too small.

Meanwhile, the characteristic of the intermediate zone is evaluated in terms of the length L of the progressive portion. In the conventional progressive multifocal ophthalmic lens, the length L of the progressive portion is 10 to 16 mm, and the maximum gradient of the variation of the focal power along the principal meridian curve is 0.20 to 0.13D/mm. In conventional lenses, since the various usages have been pursued, the length L of the progressive portion is relatively small. If the length L is too large, the line of vision is required to be put considerably downward when using the near zone, i.e., in the near vision viewing zone, and consequently, the near vision viewing becomes very troublesome. As mentioned above, in conventional lenses for the various uses in which clear viewing of the visions from distant to close is pursued, the near vision viewing cannot be sacrificed. Considered only with respect to the intermediate vision viewing, however, these conventional lenses are very inconvenient. In other words, when the length L of the progressive portion is small and the gradient of the focal power variation is large, even if the line of vision moves only a little, the focal power along the path of the line of vision changes abruptly. Accordingly, when looking at the object at an intermediate position, the suitable portion on the lens (that is, the portion having the suitable focal power for looking at an object at a certain distance) must be sought each time according to the distance from the eye to the object. Moreover, such a suitable portion on the lens is narrow. Also, the short progressive portion and the large gradient of focal power variation cause increased astigmatism, distortion and shaking of the images in the lateral portion of the intermediate zone and yield an uncomfortable view for the wearer of the lens.

Next, the characteristic of the near zone is evaluated in terms of the maximum width W of the region with astigmatism no more than 1.0D. In the conventional progressive multifocal lens, the maximum width W is about 20 mm and rarely is more than 30 mm. Considering that it is sufficient if the vision as wide as one page of a book (about 15 cm at the distance of about 30 cm) or less is clearly viewed in the usage for near vision viewing such a reading, the optimal value of W is defined to be 15 mm or less. Then, W of the conventional lenses is too large. This large W affects not only the lateral portions of the near zone but also the lateral portions of the intermediate zone, so that astigmatism and distortion and shaking of the images increase in these portions. Furthermore, if W is large, the contour of astigmatism of 1.0D as described above with respect to the characteristic of the far zone is pushed upward, thus affecting the far zone.

Figure 4:
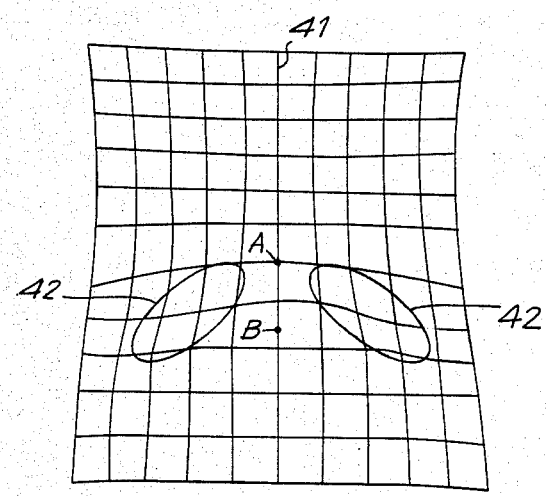
FIG. 4 depicts the distortion of images of a square grid when viewed through a progressive multifocal ophthalmic lens constructed in accordance with the prior art.

Finally, the minimum width S of the region with astigmatism of no more than 1.0D in the intermediate zone is related to the maximum width W thereof in the near zone. In the conventional progressive multifocal ophthalmic lens, the maximum width W is from 2 to 3 times up to 7 to 8 times as large as the minimum width S. As shown by FIG. 4, such a large difference between W and S as above causes a large distortion of the images in portions beside the point B identified by 42 and makes the wearer of the lens become dizzy or nauseous.

Accordingly, it is an object of this invention to eliminate the above-described problems of conventional progressive multifocal ophthalmic lenses and to provide a progressive multifocal ophthalmic lens which is very suitable for use in active circumstances such as sports, driving a car or outside-walking for shopping, i.e., a progressive multifocal ophthalmic lens improved to provide an excellent view of the far vision and the intermediate vision with little shaking and blurring of images.

The progressive multifocal ophthalmic lens in accordance with this invention includes a refractive surface containing the large regions suitable for far vision viewing and intermediate vision viewing, respectively, and the region suitable for near vision viewing which is as large as or a little larger than the above region in the intermediate zone, and the focal power along the principal meridian curve varies progressively.

The structure of the refractive surface of the progressive multifocal lens in accordance with this invention and the use of such a structure are now described in detail.

In order to improve the intermediate vision viewing through the intermediate zone, the gradient of the focal power variation along the principal meridian curve is required to be made small. If the gradient of focal power variation is small, when looking at an object at an arbitrary distance, the region on the lens suitable for viewing the object is expanded in the vertical direction and the region where the astigmatism in the central portion including the principal meridian curve is no more than 1.0D (hereinafter referred to as "the intermediate zone central portion") is expanded in the lateral direction. The above two effects both improve the intermediate vision viewing. Though generally the smaller the gradient of the focal power variation is, the better, the present inventors undertook experiments to define the optimal upper limit of the gradient for excellent intermediate vision viewing as the aim of this invention, taking its influence to the far and the near zones into account. The approach of the experiments is that progressive multifocal lenses having different lengths L of the progressive portion in which the focal power along the principal meridian curve in the intermediate zone is made to be linear, are designed and prepared, and controlled studies were conducted on these sample lenses employing carrying tests and so on. These studies demonstrated that the length L of the progressive portion is preferably at least 18 mm. For example, in the case where L is 18 mm and the additional power is 2.0D, the minimum width S of the intermediate zone central portion is about 9 mm, which is sufficient, as mentioned above, and the distortion and shaking of images through the lateral portions are small. When L is 18 mm and the additional power is more than 2.0D, the gradient of the focal power variation becomes large, the minimum width S is slightly reduced, and consequently, the distortion and shaking of the images slightly increase. However, this condition is still within the allowable range to achieve the object of this invention.

Now, the optimal conditions for the intermediate vision viewing are summarized as follows:

1. Astigmatism . . . no more than 1.0D
2. The gradient of the focal power variation . . . no more than (additional power/18) D/mm Additionally, as a result of the sequential studies on the near vision viewing by carrying tests and various optical calculations, the optimal conditions for the near vision viewing are:

3. Astigmatism . . . no more than 1.0D
4. The mean focal power . . . within the near zone reference focal power $D_2 \pm 0.5D$.

Condition 3 is the same as condition 1 for the intermediate zone central portion. In order to realize a lens having the portion in which conditions 3 and 4 are met, each point on one of the refractive surfaces constituting the lens in the near zone is designed to satisfy the following two conditions:

$$|C_1 - C_2| \leq 1/(N-1)(m^{-1}) \qquad 3'.$$

$$\frac{D_2 - 0.5}{N-1} \leq \frac{C_1 + C_2}{2} \leq \frac{D_2 + 0.5}{N-1} (m^{-1}), \qquad 4'.$$

where $C_1$ and $C_2$ are the principal curvatures at each point on the refractive surface (units: $m^{-1}$) and N is the refractive index of the lens material. When the configuration of the refractive surface of the lens is to be described accurately, the expression of conditions 3' and 4' should be used. However, since conditions 3' and 4' perfectly correspond to conditions 3 and 4, respectively, in the following description, the expression of conditions 3 and 4 is used for simplicity. The region in which these conditions 3 and 4 are met is referred to as the near zone central portion.

An attempt is made to define the optimal width of the near zone central portion in relation to the width of the intermediate zone central portion. Under the circumstances of giving priority to the improvement of the far and the intermediate vision viewing and to the reduction of the distortion and shaking of images, the maximum width W of the near zone central portion should be at the smallest limit of the allowable range. As mentioned above, the maximum width W can be 15 mm or less. However, considering the fact that as the additional power increases, the distortion and shaking of images also increase, the present inventors have determined that the optimal maximum width W according to the additional power is expressed as:

$$W \leq 30/A (mm)$$

where A is the value of the additional power Ad expressed in units of diopter.

Further, in order to reduce the distortion and shaking of images through the lateral portions of the intermediate and the near zones, the maximum width W of the near zone central portion should be 1.5 or less times as large as the minimum width S of the intermediate zone central portions, that is, $$W \leq 1.5 \times S (mm)$$

In theory, in order to reduce the distortion and shaking of images, the relation $W = S$ is most favorable. However, in view of the width required for the near vision viewing, the above condition is considered to be optimal.

Hereinbefore, the conditions for the intermediate and the near vision viewing have been explained. If the progressive multifocal ophthalmic lens is designed so that all requirements mentioned before suffice, the intermediate vision viewing and the near vision viewing are of course improved, and at the same time, the far vision viewing is improved since astigmatism in the far zone becomes small and the blurring of images of objects lying at the lateral position is reduced. Thus, an object of this invention is fully achieved by designing the progressive multifocal ophthalmic lens according to the above conditions.

Furthermore, the present inventors have studied the configuration of the refractive surface of the lens in the far zone in order to improve the far vision viewing.

In theory, the far zone provided with the spherical surface presents the most excellent far vision viewing. However, if the whole far zone is spherical, the distortion and shaking of images through the intermediate and the near zones increase and the characteristics of the intermediate vision viewing and the near vision viewing may be deteriorated. Additionally, in most progressive multifocal ophthalmic lenses, the far zone is provided with an aspherical surface. The present inventors have assessed the allowable degree of asphericity of the far zone, that is, the degree of aberration from a spherical surface, and have found the two conditions for achieving an excellent far vision viewing as below as for the near zone central portion:

5. astigmatism . . . no more than 1.0D
6. mean focal power . . . within the far zone reference focal power D1±0.5D Then the present inventors examined the optimal expanse for an excellent far vision viewing. Ideally, the refractive surface where the above two requirements are met should extend as low as possible with respect to the horizontal line when glazed H'. However, a too-wide far zone results in increased distortion and shaking of the images through the intermediate zone. Moreover, the larger the additional power is, the more the distortion and shaking of the images are. So considering the association with the additional power, the optimal expanse of the region of the refractive surface satisfying the above conditions 5, 6 has been found to be the portion above the line drawn downward from the horizontal line when glazed by an angle of $[50-(A\times 20)]$ degree which A is the value of the additional power Ad expressed in units of diopter. If the sign of the result of the above subtraction is minus, the line inclines upward.

For example, when the additional power is 2.0D, the region lies above the line drawn downward from the horizontal line when glazed by 10°, and when the additional power is 3.0D, the region lies above the line drawn upward from the horizontal line when glazed by 10°. By locating the region satisfying the abovementioned two conditions 5, 6 as above, the totally desirable progressive multifocal ophthalmic lens is obtained. However, it is not necessarily required that the total surface above the line satisfy the conditions 5, 6. At the time of far vision viewing, the portion lying above the visual angle of 30° is not used very often, and the portion lying above the visual angle of 40° is out of the gazing field, and accordingly, the peripheral portion of the lens is not strictly required to satisfy the conditions 5, 6.

This invention is explained in detail with reference to the embodiments described below.

EMBODIMENT 1

Figure 6:
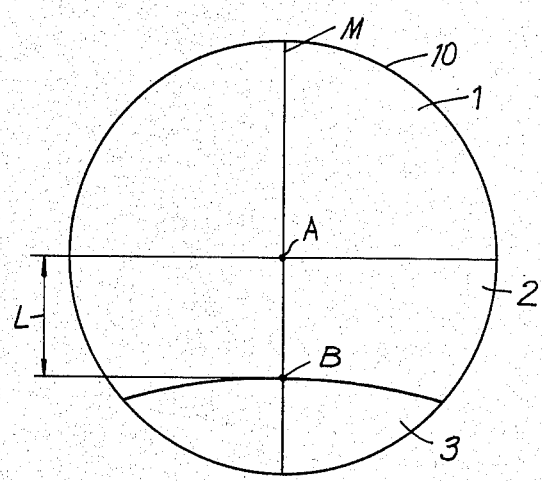
FIG. 6 is a schematic plan view of the convex refractive surface of a progressive multifocal ophthalmic lens constructed in accordance with a first embodiment of the present invention.

FIG. 6 is a plan view of the convex refractive surface of the progressive multifocal ophthalmic lens in accordance with this invention including a far zone 1, an intermediate zone 2, a near zone 3, and a principal meridian curve M.

Figure 7:
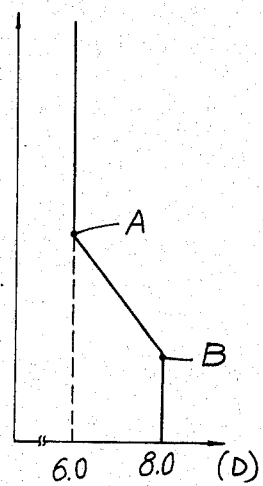
FIG. 7 is a graph depicting the focal power variation along the principal meridian curve of the progressive multifocal ophthalmic lens depicted in FIG. 6.

FIG. 7 illustrates the variation of the focal power along the principal meridian curve of the lens of FIG. 6. The focal power in the far zone lying above the point A is constantly 6.0D, that in the near zone lying below the point B is constantly 8.0D, and from A to B the focal power increases generally linearly except for the portion adjacent to each point. That is, the far-zone reference focal power D1 is 6.0D, and the near-zone reference focal power D2 is 8.0D Accordingly, the additional power Ad of this lens is 2.0D.

In the lens of FIGS. 6 and 7, the distance between the points A and B, i.e., the length L of the progressive portion, is 20 mm, and the maximum gradient of the focal power variation along the principal meridian curve M is about 0.1D/mm. The point A is the geometrical center and the optical center of this lens. Hereinafter, the point A and the point B are referred to as the far zone center and the near zone center, respectively.

Figure 8:
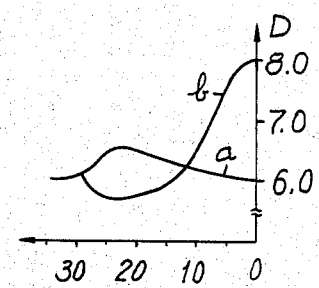
FIG. 8 is a graph depicting the variation of the focal power on the intersection of the refractive surface in a plane orthogonal to the principal meridian curve in the far vision viewing zone and the near vision viewing zone of the lens depicted in FIG. 6.

In FIG. 8, curve "a" illustrates the variation of the focal power along the intersection of the refractive surface with the plane orthogonal to the principal meridian curve M in the far zone. Since the progressive ophthalmic lens of this embodiment is bilateral-symmetrical, the description is with respect to only a half of the lens. As is shown by FIG. 8, the focal power is constantly 6.0D from the principal meridian curve M to the point 2 mm spaced from M and progressively increases to 6.5D at the point 25 mm spaced from M and then progressively decreases to reach 6.0D again. Thus, by keeping the maximum value at 6.5 D, that is, by keeping the difference between "a" in FIG. 8 and the focal power along the principal meridian curve M in the far zone (the far-zone reference focal power) no more than 0.5D, the astigmatism in the far zone can be maintained at no more than 0.5D. Also, by the design in which the focal power at the point apart from the principal meridian curve M is larger than that on the principal meridian curve M, the magnification of the lens in the lateral portions of the far zone increases to be close to the magnification in the intermediate or the near zone, and the distortion of images through the lateral portion of the far zones is reduced. Accordingly, if the far zone is provided with an aspherical surface as described above, the characteristics of the lateral portions of the intermediate and the near zones are improved without deteriorating the characteristic of the far vision viewing, compared with the case where the total far zone is provided with a spherical surface.

In FIG. 8, "b" illustrates the variation of the focal power along the intersection of the refractive surface with a plane orthogonal to the principal meridian curve M in the near zone. Similar to the far zone, the focal power is constant in a certain section. Then, the focal power progressively decreases and sequentially, progressively increases into the lateral direction, finally to arrive at 6.0D, which is the same as the far-zone reference focal power. The focal power is made to be 7.0D at the point about 7.5 mm apart from the principal meridian curve M, so that the width of the region with astigmatism of no more than 1.0D (the near zone central portion) is about 15 mm. Also, by design in which the focal power at the point apart from the principal meridian curve M is smaller than the focal power on the principal meridian curve M, the magnification in the lateral portions of the near zone decreases to be close to the magnification of the intermediate or the far zone, and consequently, the distortion of images through the lateral portions of the near zone is reduced.

In this embodiment of the progressive multifocal ophthalmic lens, the focal power variation along the principal meridian curve and the locations of the far and near zones are designed as explained so far, and the intermediate zone is defined as described in U.S. patent application Ser. No. 327,288. That is, the intermediate zone is provided in the manner that the demarcations between the far zone and the intermediate zone and between the intermediate zone and the near zone are defined so that the vertical width of the intermediate zone increases in the direction of the peripheral portion of the lens and that an angle formed by a line normal to the surface of each point of the intersection of the refractive surface with an arbitrary plane in parallel with the plane including the principal meridian curve and a plane including the principal meridian curve changes in the same manner as the change of the focal power along the principal meridian curve.

Figure 9:
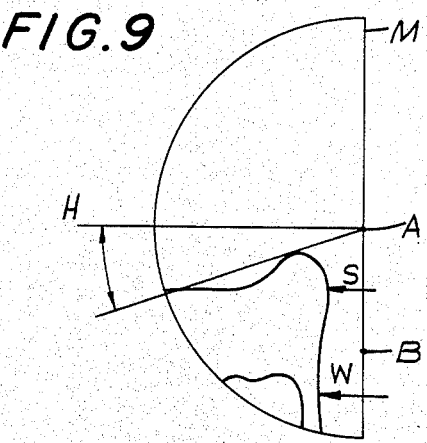
FIG. 9 shows the distribution of astigmatism of the lens depicted in FIG. 6.

FIG. 9 shows the distribution of the astigmatism of the lens designed as explained above. In FIG. 9, the line identified by, for example, 1.0 is a contour of the astigmatism of 1.0D. As is shown, the minimum width S of the intermediate zone central portion is about 10 mm, which is much larger than the conventional lenses.

Figure 10:
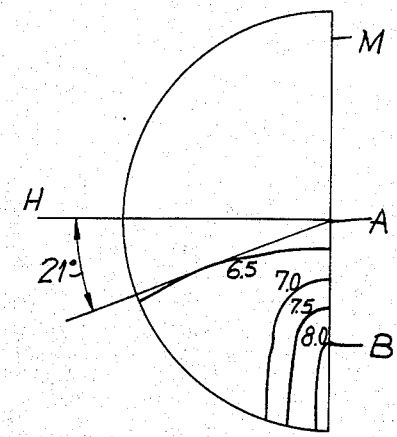
FIG. 10 shows the distribution of the mean focal power of the lens depicted in FIG. 6.

FIG. 10 shows the distribution of the mean focal power of this lens. As shown in both FIGS. 9 and 10, the maximum width W of the near zone central portion is about 15 mm. Accordingly, the maximum width W is 1.5 times as large as the minimum width S. Thus, since the difference in the spaces between the contours of the astigmatism in the intermediate zone and the near zone is small, the distortion of images through the lateral portions of the point B is small, and the feeling of the wearer is improved.

As can be seen in FIG. 9, the contour of the astigmatism of 1.0D starting from the lower end of the refractive surface first extends upward generally parallel to the principal meridian curve and then extends in the direction of the lateral portion of the lens. Especially in the intermediate zone, the space between each contour of the astigmatism is large. Accordingly, in accordance with the progressive multifocal ophthalmic lens having the distribution of astigmatism as above, the shaking of images caused by, for example, the lateral rotation of the wearer's head is less than in the conventional progressive multifocal ophthalmic lenses (the lenses shown by FIGS. 3 and 5), since the change of the astigmatism at each point on the refractive surface is small in this embodiment.

In this embodiment, the fitting point is defined at the point A and the angle of rotation of lens for the convergence is 8°. In FIG. 9, the tangent oriented at the point A with the contour of the astigmatism of 1.0D is the line which inclines downward by an angle of about 20° from the horizontal line H. Considering the above condition with respect to the horizontal line when glazed, on the refractive surface above the line inclining downward by about 12°, the astigmatism is no more than 1.0D at any point. In FIG. 10, the tangent oriented at the point A with the contour of the mean focal power of 6.5D is the line inclining downward by about 21° from the horizontal line H. Thus, while FIG. 6 shows that the far zone lies above the horizontal line H, in view of the focal power, the region as low as 21° from the horizontal line H can be used for the far zone. If both the astigmatism and the mean focal power are taken into account, the region of the refractive surface above the line drawn downward by about 12° from the horizontal line when glazed H' is regarded to be suitable for the far vision viewing.

In accordance with this embodiment of the progressive multifocal ophthalmic lens, a very wide, especially in the horizontal direction, and comfortable far vision can be obtained even in the lower part of the far zone. In this embodiment, the refractive surface is divided into the far zone, the intermediate zone and the near zone. However, these names for different zones are used only for convenience in designing, and as mentioned above, the upper part of the intermediate zone may be regarded as the region suitable for far vision viewing, and the lower part of the intermediate zone may be regarded as the region suitable for near vision viewing.

In the progressive multifocal ophthalmic lens of this embodiment, the length of the progressive portion is large and the region suitable for near vision viewing is narrow. However, as mentioned above, the frequency of use of the near zone in the progressive multifocal lens of the type to which this invention pertains is very low. So, the slight defect of the near zone can be compensated for by looking at the nearby object while pushing up the glasses a little or by using the wide progressive portion (the intermediate zone central portion) according to the case. The characteristic of the near zone of this embodiment proved to be satisfactory in actual carrying tests.

Moreover, this embodiment of the progressive multifocal lens in accordance with this invention is demonstrated to be suitable not only for the active uses but also for the various other uses. That is, in general, people rarely use near vision viewing for a long time, and thus, a region suitable for near vision viewing as wide as in this embodiment is usually sufficient. Furthermore, the wide progressive portion compensates for the narrowness of the region suitable for near vision viewing. In addition, the reduced shaking and distortion of images in accordance with this invention make the progressive multifocal ophthalmic lens far more convenient than conventional lenses.

EMBODIMENT 2

The second embodiment of the progressive multifocal ophthalmic lens has the basic refractive surface which is the same as that of Embodiment 1 and has the additional power of 3.0D.

Figure 11:
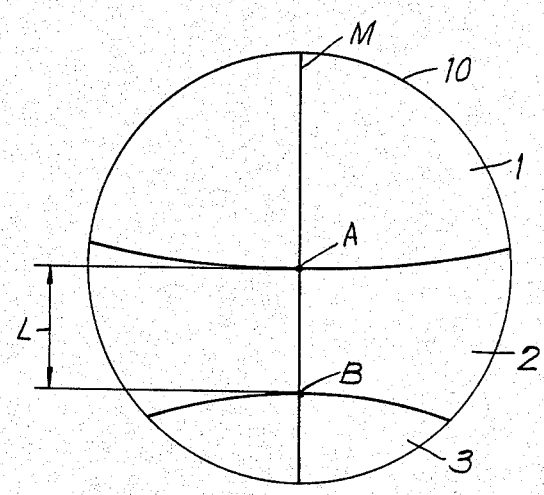
FIG. 11 is a schematic plan view of the structure of the convex refractive surface of a progressive multifocal ophthalmic lens constructed in accordance with a second embodiment of the present invention.
Figure 12:
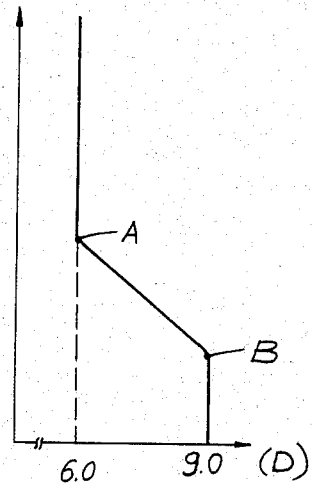
FIG. 12 is a graph depicting the focal power variation along the principal meridian curve of the lens depicted in FIG. 11.
Figure 13:
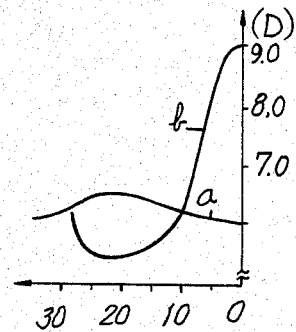
FIG. 13 is a graph depicting the variation of the focal power on the intersection of the refractive surface in a plane orthogonal to the principal meridian curve in the far vision viewing zone and the near vision viewing zone of the lens depicted in FIG. 11.

FIGS. 11, 12 and 13 illustrate the arrangement of the various zones, the variation of the focal power along the principal meridian curve M and the variations of the focal powers in the far zone and the near zone, respectively. The main differences between Embodiment 2 and Embodiment 1, whose additional power is 2.0D, are that as specifically shown by FIG. 11, in Embodiment 2, the demarcation between the far zone and the intermediate zone lies closer to the far zone in the peripheral portion of the lens than in Embodiment 1, and that as specifically shown by FIG. 13, the focal power in the horizontal direction in the near zone is designed to vary in the manner as shown by the curve "b", in which the focal power arrives at 8.0D at the point about 5 mm apart from the principal meridian curve M, on which the focal point is 9.0D.

Both of the above conditions of Embodiment 2 mean that the regions suitable for far vision viewing and near vision viewing, respectively, are smaller than in Embodiment 1. Such a design is used because if these regions are large, as in Embodiment 1, the distortion and shaking of images notably increase. As shown by the curve "a" in FIG. 13, the focal power in the horizontal direction in the far zone is constantly 6.0D from the point on the principal meridian curve M to the point about 2 mm apart from the principal meridian curve M, then progressively increases to 6.5D at the point about 21 mm away from the principal meridian curve M, being almost constantly 6.5D to the point about 25 mm away from the principal meridian curve and progressively decreases to 6.0D again. Thus, there is a slight difference between the variation of the focal power in the horizontal direction in the far zone of Embodiment 2 and that of Embodiment 1, which difference is made in an attempt to reduce the distortion and shaking of images through the lateral portions of the intermediate zone.

Figure 14:
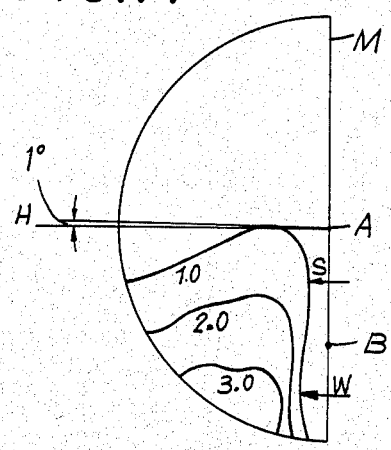
FIG. 14 shows the distribution of astigmatism of the lens depicted in FIG. 11.
Figure 15:
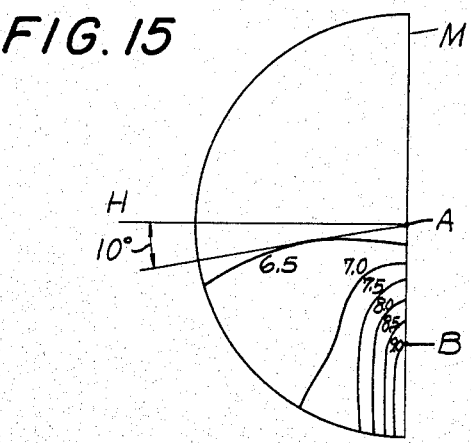
FIG. 15 depicts the distribution of the mean focal power of the lens depicted in FIG. 11.

FIGS. 14 and 15 illustrate the distribution of the astigmatism and the distribution of the mean focal power of this embodiment of the progressive multifocal ophthalmic lens, respectively.

Given that the horizontal line when glazed H' is obtained by rotating the horizontal line H by an angle of 8°, as in Embodiment 1, the region with astigmatism of no more than 1.0D lies on the refractive surface above the line drawn upward by about 9° from the horizontal line when glazed, and the region with the mean focal power of no more than $6.0 \pm 0.5$D lies on the refractive surface above the line drawn downward by about 2° from the horizontal line when glazed. Thus, even though slightly smaller than in Embodiment 1, an excellent far vision which is large in the horizontal direction is obtained in accordance with this embodiment.

In the progressive multifocal ophthalmic lens of this embodiment, the maximum width W of the region suitable for near vision viewing and the minimum width S of the region suitable for intermediate vision viewing are approximately 10 mm and 7 mm, respectively, and the maximum width W is 1.4 times as large as the minimum width S.

In Embodiment 2, similar to Embodiment 1, the far vision viewing and the intermediate vision viewing are improved, and the distortion and shaking of images are far less than in conventional lenses. Accordingly, the progressive multifocal ophthalmic lens of this embodiment is very suitable for use in active activities and, moreover, is available for various uses because of the wide progressive portion and the reduced shaking of images.

In the above two embodiments of this invention, the focal power along the principal meridian curve above the point A and below the point B is constant. However, the focal power in these sections does not necessarily have to be constant, and a small increase or decrease (at most 0.5D) of the focal power with respect to that on the points A or B does not alter the effect of this invention. This condition is easily understood because the mean focal power of the region suitable for far vision viewing or near vision viewing is the reference focal power $\pm 0.5$D in each zone, as explained above. Also, the variation of the focal power along the principal meridian curve between the points A and B should not necessarily be linear but is allowed to be like a sine curve as long as the maximum gradient of the focal power variation is less than the predetermined value. Accordingly, the variation of the focal power along the principal meridian curve as shown by FIG. 16 or FIG. 17 is also acceptable.

Figure 16:
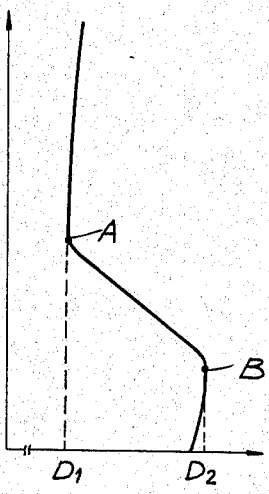
FIGS. 16 and 17 illustrate other examples of focal power variation along the principal meridian curve in lenses constructed in accordance with the present invention.
Figure 17:
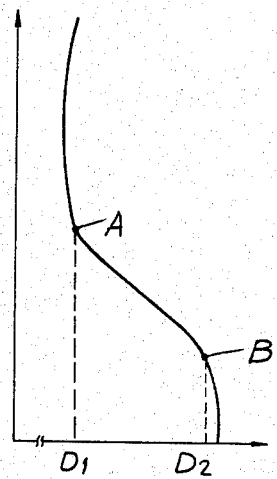

In the progressive multifocal ophthalmic lens having the focal power variation as shown above by FIG. 7 or FIG. 12, the point A at the lowest end of the far zone and the point B at the top end of the near zone are the starting point and the terminating point of the increment of the focal power, respectively, and the same is to be said with respect to the lens having the focal power variation as shown by FIG. 16. On the other hand, in the lens having the focal power variation as shown by FIG. 17, the points A and B are the points where the gradient of the focal power increment changes. That is, the increasing rate of the focal power changes from large to small at the point A and vice versa at the point B. In either of the progressive multifocal ophthalmic lenses mentioned above, the focal powers on the points A and B are the far-zone reference focal power D1 and the near-zone reference focal power D2, respectively.

Figure 18:
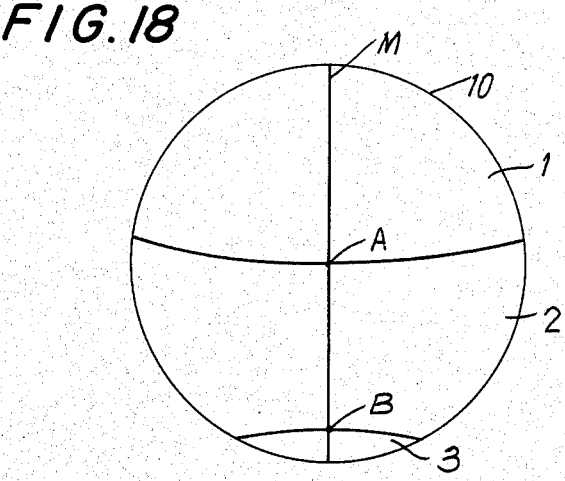
FIGS. 18 and 19 illustrate further examples of focal power variation along the principal meridian curve of lenses constructed in accordance with the present invention.
Figure 19:
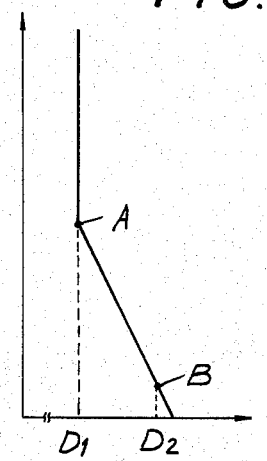

FIGS. 18 and 19 show another variation of the progressive multifocal ophthalmic lens of this embodiment, in which the point B cannot be defined in terms of the point where the gradient of the focal power change. In this lens, a certain point on the principal meridian curve where the astigmatism is smaller by about 0.5D than that at the lowest end of the principal meridian curve of the lens body 10 is defined to be the point B, and the region below the point B is regarded to be the near zone. In this case, the near zone is rather small but is enough for the purpose of this invention in which the near vision viewing is less significant than the far and the intermediate vision viewing zones.

EMBODIMENT 3

Figure 20:
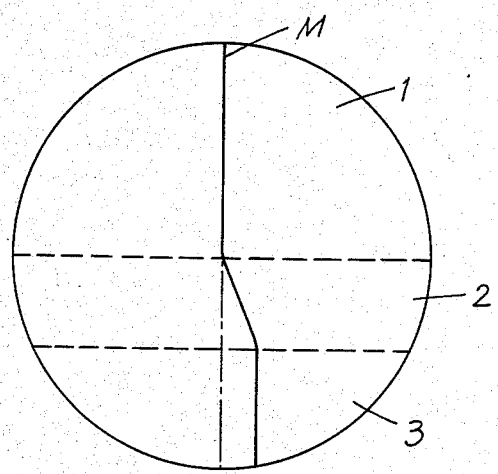
FIG. 20 is a plan view of the refractive surface of a progressive multifocal ophthalmic lens in accordance with the prior art.

FIG. 20 is a plan view of a refractive surface of the progressive multifocal ophthalmic lens disclosed in Canadian Pat. No. 1,152,369, including the far zone 1, the intermediate zone 2, the near zone 3 and the principal gazing line M.

When the line of vision is shifted from a distant object lying in front upward to a nearby object lying in front downward through the ophthalmic lens, the path of the line of vision is biased to the side of the nose due to the convergence. The locus of the path of the line of vision as above on the refractive surface is the principal gazing line, which gazing line divides the refractive surface of the lens into the nose-side segment and the temple-side segment. Though the principal gazing line corresponds to the principal meridian curve in, for example, FIG. 5, the term "the principal gazing line" is used in the following description.

The progressive multifocal ophthalmic lens disclosed in Canadian Pat. No. 1,152,369 is designed so that the horizontal difference and the vertical difference of the distortion of images through the lateral portions of the intermediate and the near zones on the nose side and through these portions on the temple side are less than the physiological tolerance in humans (it is said to be 0.5 prism diopter in general) in order to facilitate the fusion by both eyes to obtain natural three-dimensional vision with the progressive multifocal ophthalmic lenses divided into the two segments as mentioned above.

Figure 21:
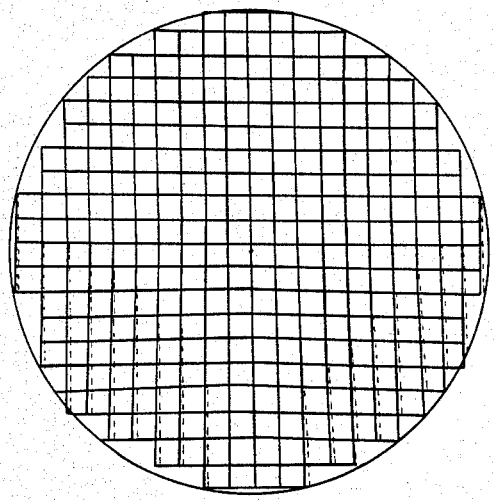
FIG. 21 illustrates the distortion of images of a square grid when viewed through the lens of FIG. 20.

FIG. 21 illustrates the distortion of images of the square grid when viewed by both eyes through the progressive multifocal ophthalmic lens designed as above for explaining the difference of the distortions perceived by the right eye (solid lines) and by the left eye (broken lines).

As is apparent from FIG. 21, there is almost no difference in the vertical direction, and the difference in the horizontal direction is small enough.

Figure 22:
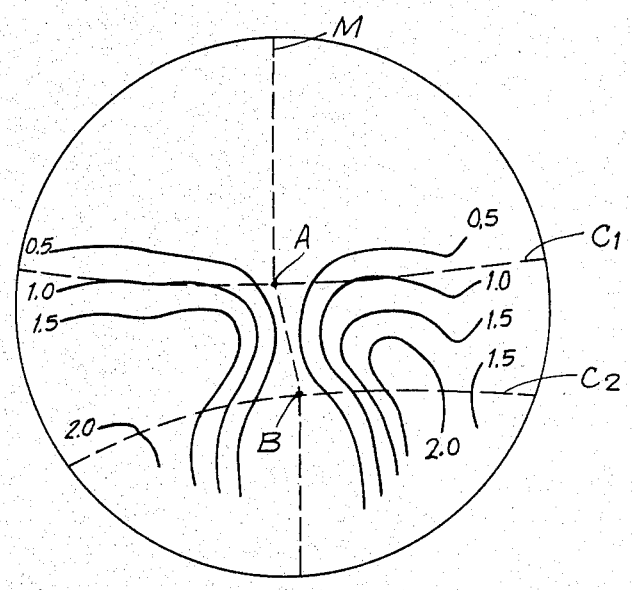
FIG. 22 depicts the distribution of astigmatism of the lens of FIG. 20.

FIG. 22 illustrates the distribution of the astigmatism of the progressive multifocal ophthalmic lens of FIG. 20. The right-hand side of FIG. 20 is the side of the nose, and the left-hand side thereof is the side of the temple. This lens is prescribed to be a plano for far vision viewing and has the additional power of 2.0D. The principal gazing line shown by the broken line M is biased to the side of the nose in the near zone. The curves C1 and C2 are the demarcations between the far zone and the intermediate zone and between the intermediate zone and the near zone, respectively. FIG. 22 illustrates the astigmatism of the progressive multifocal ophthalmic lens as the lens astigmatism. However, since the prescribed power of this lens in plano, FIG. 22 is regarded as illustrating the distribution of the surface astigmatism (the difference between the maximum and the minimum surface power at a point on the curved surface of the lens; on a spherical surface, the surface astigmatism is 0 because the surface power is equal in all directions) on the aspherical surface of the progressive multifocal lens. As shown by FIG. 22, the biased principal gazing line to the side of the nose causes the astigmatism on the nose side to be larger than that on the temple side in the intermediate zone and the near zone (especially remarkable in the intermediate zone). This is because the intermediate zone, which is the transient zone where the transformation of the curved surface from the far zone to the near zone is inevitable, is narrower on the side of the nose.

Now, in this progressive multifocal ophthalmic lens, reference is made to the region having astigmatism of no more than 0.5D (in this region, the astigmatism is not perceived by the wearer in general, and the region is hereinafter referred to as the clear viewing zone) and to the region having astigmatism of no more than 1.0D (in this region, though the astigmatism is indeed perceived by the wearer, there is no practical problem, and the region is hereinafter referred to as the practical clear viewing zone). (The practical viewing zone of course includes the clear viewing zone.) In this lens, the far zone belongs to the clear viewing zone except for the lateral portions adjacent to the intermediate zone, and the total area of the far zone is covered by the practical clear viewing zone. In the intermediate zone, the clear viewing zone and the practical viewing zone having the minimum widths of approximately 4 mm and 8 mm, respectively, lie centered around the principal gazing line. The near zone includes the clear viewing zone and the practical viewing zone having the maximum widths of approximately 14 mm and 17 mm, respectively, centered around the principal gazing line. In the design of the progressive multifocal ophthalmic lens, the clear viewing zone and the practical clear viewing zone have similar characteristics, and accordingly, only the practical clear viewing zone is referred to in the following description.

In this progressive multifocal lens, the length of the principal gazing line belonging to the intermediate zone, that is, the length of the principal gazing line required for providing the predetermined additional power (2.0D in this case) by the increment of the focal power between the far zone and the near zone (hereinafter referred to as the length of the progressive portion) is about 15 mm.

Figure 23:
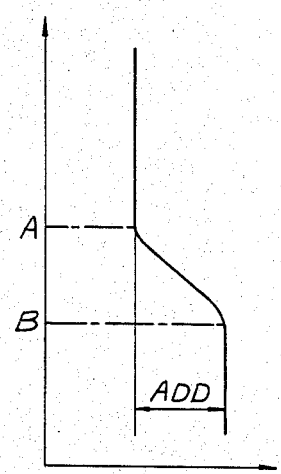
FIG. 23 is a graph illustrating the focal power variation along the principal gazing line of the lens of FIG. 20.

FIG. 23 shows the variation of the focal power along the principal gazing line, in which the ordinate is the position on the principal gazing line and the abscissa is the focal power. A, B are the cross points of the principal gazing line and the demarcations C1, C2, respectively. The length of the progressive portion of the progressive multifocal ophthalmic lenses presently available is 6 mm at the shortest and 16 mm at the longest.

Figure 24:
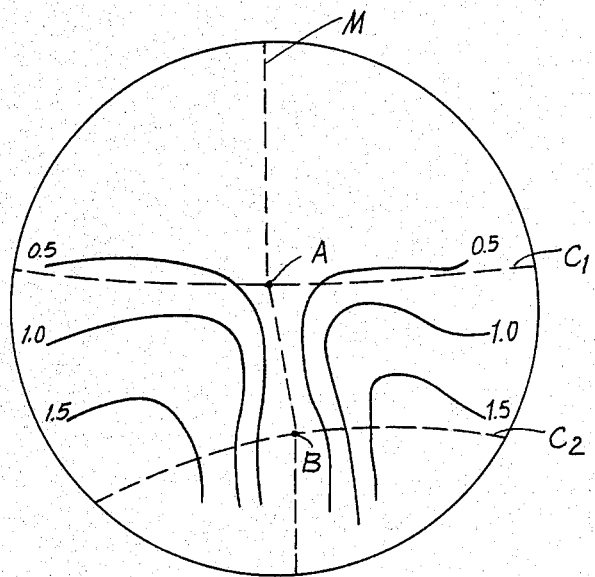
FIG. 24 illustrates the distribution of astigmatism in a lens according to a third embodiment of the present invention.
Figure 25:
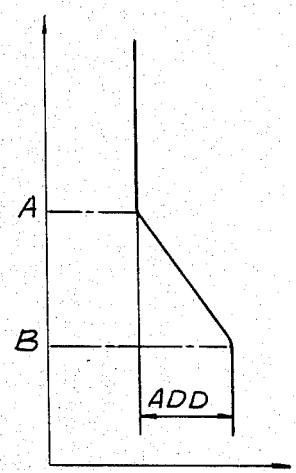
FIG. 25 is a graph depicting the focal power variation along the principal gazing line of a lens constructed in accordance with the third embodiment of the present invention.

The characteristic of the third embodiment of the progressive multifocal ophthalmic lens in accordance with this invention is shown by FIGS. 24 and 25.

FIGS. 24 and 25 illustrate the distribution of the astigmatism and the variation of the focal power along the principal gazing line, respectively. This embodiment is prescribed to be a plano at the time of far vision viewing and has the additional power of 2.0D, which are the same conditions as in the above-mentioned lens according to Canadian Pat. No. 1,152,369.

In the progressive multifocal ophthalmic lens of Embodiment 3, the length of the progressive portion is 20 mm, and the maximum width of the practical clear viewing zone in the near zone is 14 mm. Thus, Embodiment 3 is characterized by the longer progressive portion and the narrower practical clear viewing zone (clear viewing zone) in the near zone than in the conventional lenses. By designing as above, the astigmatism of the intermediate zone and the shaking of images through the intermediate zone are greatly improved as shown by FIG. 24. To be more concrete, the width of the practical clear viewing zone in the intermediate zone lying centered around the principal gazing line is about 11 mm, which is larger than the above-mentioned lens by 30 to 40 percent. Moreover, in the lateral portions outside the practical clear viewing zone in the intermediate zone, the astigmatism is remarkably reduced as compred with conventional lenses. In the lateral portions, the astigmatism increases by a substantially constant rate in the direction from the far zone to the near zone, and the increment of the astigmatism between the far and the near zones is very smooth. Accordingly, wide intermediate vision is obtained in accordance with this embodiment.

Furthermore, as shown by FIG. 25, the gradient of the focal power variation along the principal gazing line is easy, and the smooth shift from the far vision viewing to the intermediate vision viewing is realized.

Also, the distribution of the astigmatism reflects the magnitude of the shaking of images caused by the movement of the wearer's head, because the variability of the astigmatism variation coincides with the variability of the variation of the distortion of images as shown by FIG. 21 which causes the shaking of images. In accordance with this invention, the variation of the distortion of images through the intermediate zone is much smoother and smaller than in the conventional lenses, indicating that the shaking of images is largely reduced.

As explained above, in accordance with Embodiment 3, the progressive multifocal ophthalmic lens which is very suitable for active uses such as sports or shopping is improved in that the natural three-dimensional vision and the wide field of the intermediate vision are obtained and the shaking of images caused by the movement of the wearer's head is extremely reduced by designing so that the vertical and horizontal differences in the distortions of images between through the nose-side segment and through the temple-side segment of the lens are less than the tolerance in humans.

EMBODIMENT 4

Figure 26:
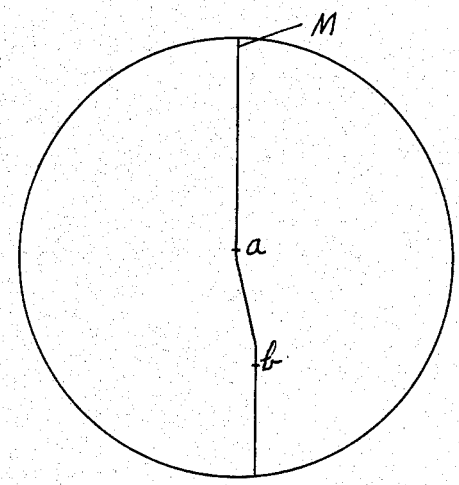
FIG. 26 is a plan view of the refractive surface of a progressive multifocal ophthalmic lens constructed in accordance with the prior art.

FIG. 26 is a plan view of the refractive surface of the progressive multifocal ophthalmic lens disclosed in U.S. Pat. No. 3,687,528 and its applied invention U.S. Pat. No. 3,910,691.

In FIG. 26, M is an umbilical curve which extends vertically in the general center of the refractive surface.

Though this umbilical curve M corresponds to the principal meridian curve as shown in FIG. 5, the term "umbilical curve" is used in the following description. The umbilical curve is defined to be a general straight line in some lenses and is biased to the side of the nose between the optical center of the region for far vision viewing and the optical center of the region for near vision viewing, as shown by FIG. 26, in others. The focal power of the refractive surface along the umbilical curve progressively varies between the optical center "a" of the region for far vision viewing and the optical center "b" of the region for near vision viewing. The difference in the focal powers is referred to as the additional power.

Figure 27:
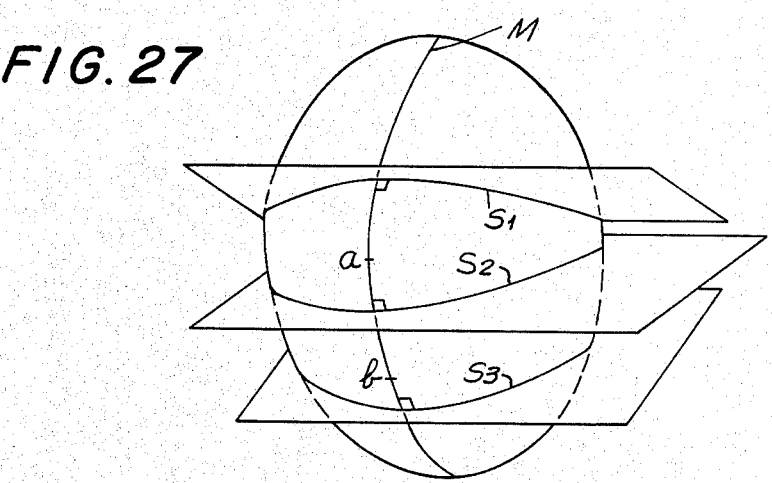
FIGS. 27, 28A, 28B and 28C are illustrations for explaining the configuration of a section of the refractive surface of the lens of FIG. 26 taken along a plane orthogonal to the umbilical curve.
Figure 28A:
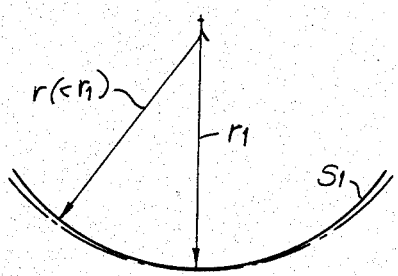
Figure 28B:
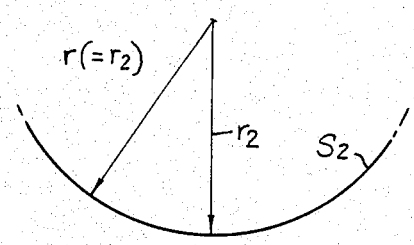
Figure 28C:
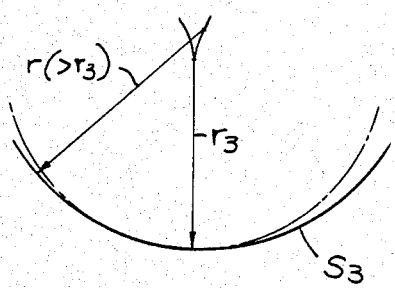

As shown by FIG. 27, the section of the refractive surface of the progressive multifocal ophthalmic lens of FIG. 26 taken along a plane orthogonal to the umbilical curve is, for a specific plane between the optical center "a" of the region for far vision viewing and the optical center "b" of the region for near vision viewing, substantially a circle having the radius of curvature equal to the radius of curvature of the umbilical curve at the point containing the section (S2 in FIG. 27, FIG. 28B). For any other orthogonal plane above and below the substantially circular section, the section of the refractive surface has the radius of curvature progressively decreasing and increasing in the direction away from the umbilical curve with respect to the radius of curvature of the umbilical curve containing the section (S1 in FIG. 27, FIG. 28A and S3 in FIG. 27, FIG. 28C), respectively.

Figure 29:
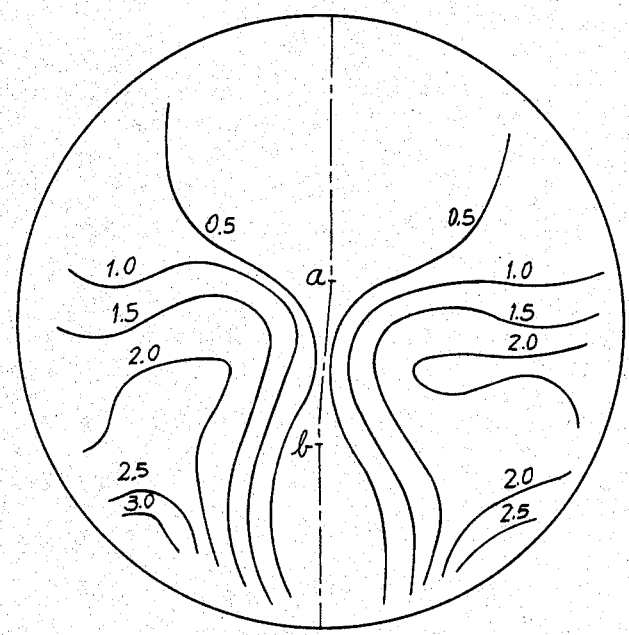
FIG. 29 depicts the distribution of astigmatism of the progressive multifocal ophthalmic lens depicted in FIG. 26.
Figure 30:
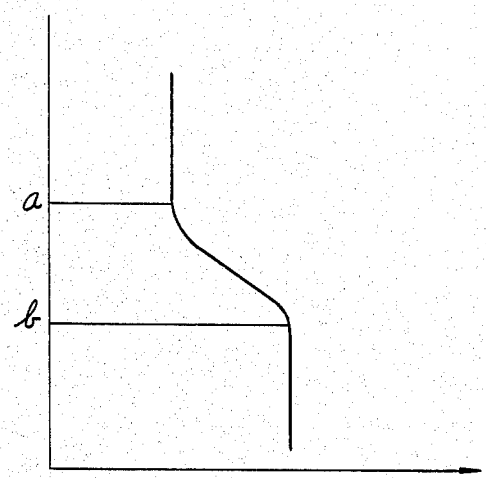
FIG. 30 is a graph depicting the focal power variation along the umbilical curve of the progressive multifocal ophthalmic lens of FIG. 26.

FIG. 29 illustrates the distribution of the astigmatism of the progressive multifocal ophthalmic lens designed as described above for explaining the characteristic of the lens. The lens shown by FIG. 29 is for the left eye, prescribed to be plano at the time of the far vision viewing, and has the additional power of 2.0D. The length of the umbilical curve between the optical center "a" of the region for far vision viewing and the optical center "b" of the region for near vision viewing is about 16 mm. The variation in the focal power along the umbilical curve is illustrated in FIG. 30.

The structural characteristics of the progressive multifocal ophthalmic lens of this type mentioned above reflect on the distribution of the astigmatism of FIG. 29 as explained below.

In the segment above the optical center "a" of the region for far vision viewing (this segment is used for viewing distant objects and is hereinafter referred to as the far zone), the astigmatism increases in the direction away from the umbilical curve. Similarly, in the segment below the optical center "b" of the region for near vision viewing (this segment is used for viewing nearby objects and is hereinafter refrred to as the near zone), the astigmatism increases in the direction away from the umbilical curve. In the segment below the optical center "a" of the region for far vision viewing and above the optical center "b" of the region for near vision viewing (this segment is used for viewing intermediate objects and is hereinafter referred to as the intermediate zone), the contours of the astigmatism embody easy hillocks on both sides of the umbilical curve. The variation in the astigmatism from the far zone through the intermediate zone to the near zone is progressive and smooth.

By distributing the astigmatism widely and making the variation thereof smooth, as mentioned above, and by preventing the abrupt distortion on the lens, the shaking of images caused by the movement of the wearer's head, which is one of the major defects of the progressive multifocal ophthalmic lens, is largely reduced in accordance with the above patents.

Figure 31:
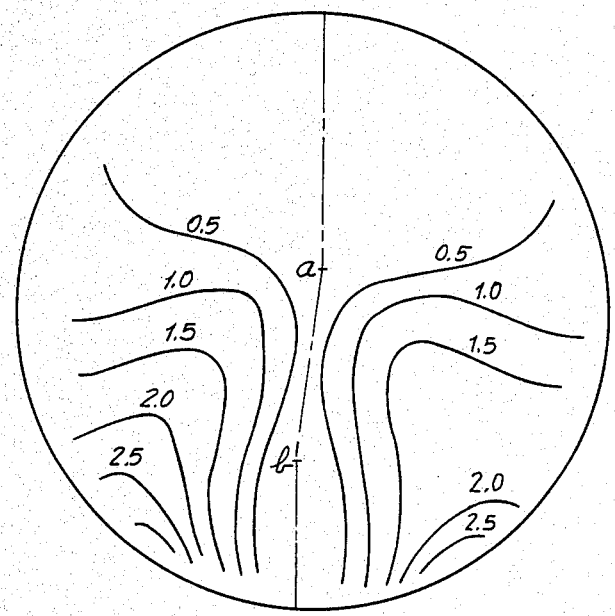
FIG. 31 depicts the distribution of astigmatism in a progressive multifocal ophthalmic lens constructed in accordance with a fourth embodiment of the present invention.

FIG. 31 illustrates the distribution of the astigmatism of the fourth embodiment of the progressive multifocal ophthalmic lens in accordance with this invention. The lens of FIG. 31 is for the left eye, presecribed to be plano at the time of the far vision viewing, and has the additional power of 2.0D, as in the lens explained above.

Figure 32:
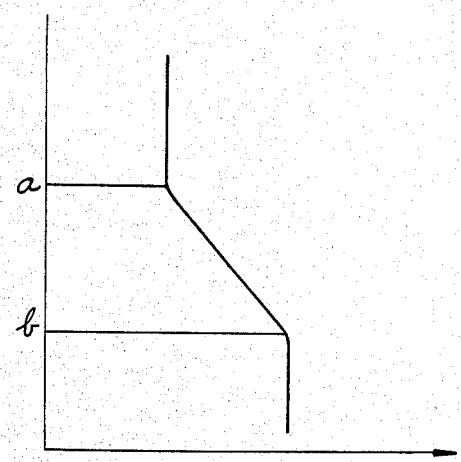
FIG. 32 is a graph depicting the focal power variation along the umbilical curve of a lens constructed in accordance with a fourth embodiment of the present invention.

FIG. 32 illustrates the variation in the focal power along the umbilical curve of the lens of FIG. 31.

In this embodiment, the length of the umbilical curve between the optical center "a" of the region for far vision viewing and the optical center "b" of the region for near vision viewing (hereinafter referred to as the length of the progressive portion) is 20 mm. The variation in the focal power along the umbilical curve in the progressive portion is almost linear except for the adjacent portions of the optical center of the regions for far and near vision viewing, respectively.

As is apparent from FIG. 31, the difference in the astigmatism increases more abruptly in the lateral portions of the near zone than in the conventional lens of the U.S. patents described above. In order to be more concrete, reference is made to the region having astigmatism of no more than 0.5D (in this region, the astigmatism is generally not perceived by the wearer, and the region is hereinafter referred to as the clear viewing zone) and the region having the astigmatism no more than 1.0D (generally, in this region, though the astigmatism is indeed perceived by the wearer, there are no practical problems, and the region is hereinafter referred to as the practical clear viewing zone). In the near zone, the maximum widths of the clear viewing zone and the practical clear viewing zone are approximately 9 mm and 14 mm, respectively, which are about 20 percent less than the widths of about 12 mm and 17 mm, respectively, in the conventional lens.

Embodiment 4 of this invention is thus characterized by the longer progressive portion and the narrower practical clear viewing zone (as well as the clear viewing zone) than in conventional lenses.

In accordance with this embodiment, the field of vision of the far zone and the intermediate zone and the shaking of images are improved in the following way.

As FIG. 31 shows, in the far zone, the astigmastism is small in the lateral portions and a wide, excellent field of vision with little blurring is obtained, and in the intermediate zone, the astigmatism is notably reduced and the minimum width of the practical clear viewing zone is about 9.5 mm, which is about 60 percent larger than that of the conventional lens (about 6 mm). The hillocks of the astigmatism in the lateral portions of the intermediate zone are easier than those of conventional lenses, indicating the decreased distortion in these portions. Consequently, the shaking of images is further reduced than in conventional lenses.

As mentioned above, the practical clear viewing zone in the near zone in this embodiment is narrower than in conventional lenses. However, since the practical significance of the near zone is less than the far and the intermediate zones in this invention, such a condition of the near zone as above is acceptable.

As described so far, in accordance with this embodiment, the shaking of images is far more improved than by the conventional lenses disclosed in the above-mentioned U.S. patents. Futhermore, the progressive multifocal ophthalmic lens in accordance with this embodiment has an expanded field of vision through the intermediate zone and is very suitable for active uses such as sports or shopping.

EMBODIMENT 5

Figure 33:
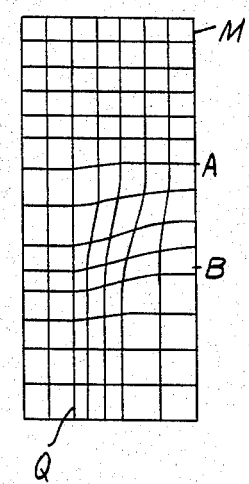
FIG. 33 depicts the distortion of images of a square grid when viewed through a progressive multifocal ophthalmic lens constructed in accordance with the prior art.
Figure 34:
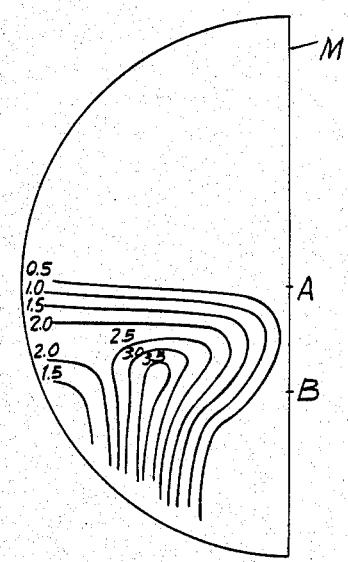
FIG. 34 depicts the distribution of astigmatism of a lens constructed in accordance with the prior art.

FIGS. 33 and 34 illustrate the distortion of images of a square grid when viewed through the progressive multifocal ophthalmic lens disclosed in U.S. Pat. No. 4,056,311 and the distribution of the astigmatism of the same lens, respectively. The lens used in FIGS. 33 and 34 has the additional power of 2.0D and a progressive portion as long as 16 mm. FIGS. 33 and 34 correspond to only the left half of the lens because the lens is bilateral-symmetrical and the right half is omitted.

In this example, the generally total surface of the far zone (zone above the point A) is provided with a spherical surface, and the near zone (zone below the point B) also includes a wide portion which is provided with a substantially spherical surface. In the lateral portions (the portions outside lines Q) in the intermediate and the near zones, the principal axes of the principal curvatures at each point lie in the horizontal and vertical directions. As a result, as shown by FIG. 33, the horizontal lines and the vertical lines of the square grids are perceived to be horizontal and vertical through the portions outside the lines Q and there is no skew distortion of the images.

On the contrary, in the portion inside the lines Q, there are portions through which the images are considerably distorted. Also, as shown by FIG. 34, the astigmatism is concentrated to these portions, leading to the severe blurring of images. Accordingly, in the intermediate zone, the region adjacent to the principal meridian curve where the astigmatism is small and the desirable visions are obtained (the clear viewing zone and the practical clear viewing zone) is very narrow and the intermediate vision viewing is uncomfortable.

Figure 35:
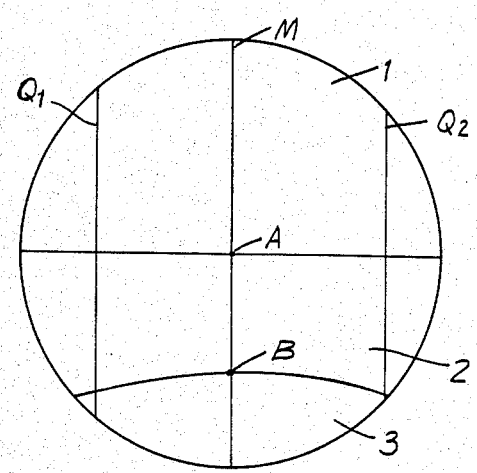
FIG. 35 is a schematic plan view of the refractive surface of a progressive multifocal ophthalmic lens constructed in accordance with a fifth embodiment of the present invention.

FIG. 35 is a plan view of the refractive surface of the fifth embodiment of the progressive multifocal ophthalmic lens in which this invention is applied to the conventional lens in accordance with the above-mentioned U.S. Pat. No. 4,056,311.

In this embodiment, the additional power is 2.0D, the length of the progressive portion is 20 mm and the focal power along the principal meridian curve in the progressive portion varies linearly. The maximum width of the region with the astigmatism no more than 1.0D in the near zone is 14 mm.

Figure 36:
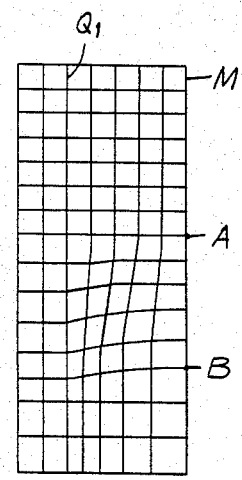
FIG. 36 illustrates the distortion of images of a square grid when viewed through the progressive multifocal ophthalmic lens of FIG. 35.
Figure 37:
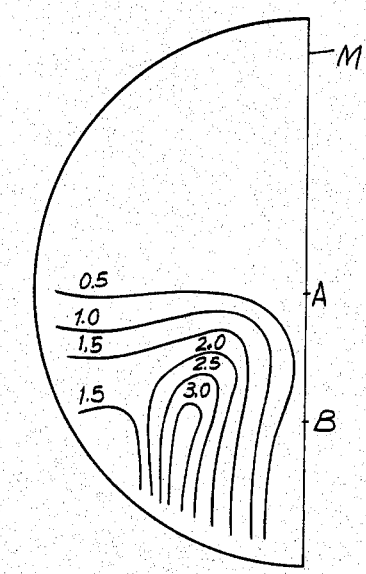
FIG. 37 depicts the distribution of astigmatism of the lens depicted in FIG. 35.

FIGS. 36 and 37 illustrate the distortion of the images of the square grids when viewed through the progressive multifocal ophthalmic lens of this embodiment and the distribution of the astigmatism of the same lens, respectively, for the left half of the lens only.

As is apparent from both drawings, the considerable distortion of the images through the portion inside the line Q1 (or Q2 in the right half) which is present in the prior art is reduced and the concentration of the astigmatism in this portion is also moderated. Thus, the intermediate vision viewing is greatly improved in accordance with this embodiment.

Accordingly, an object of this invention to provide the progressive multifocal ophthalmic lens in which the wide field of far vision is obtained and the shaking of images is reduced is fully attained.

As explained in detail with reference to the embodiments described above, by designing the progressive multifocal ophthalmic lens so that the length of the progressive portion is much larger and the gradient of the focal power variation is easier than in conventional lenses, the wide fields of the intermediate vision and the far vision are assured and the distortion and shaking of image through the lateral portions of the lens are remarkably reduced in accordance with this invention.

Moreover, by narrowing the region suitable for the near vision viewing more than in conventional lenses, the wide fields of vision of generally the same width are obtained in the area from the intermediate zone to the near zone, consequently largely reducing the distortion and the shaking of images through the lateral portions of the lens.

Thus, in accordance with this invention, the progressive multifocal ophthalmic lens improved in that the fields of the far vision and the intermediate vision are expanded and the distortion and shaking of images are very small compared with conventional lenses is obtained.

Accordingly, the progressive multifocal ophthalmic lens in accordance with this invention is very suitable for active uses such as sports like golf, driving a car, outside walking for shopping and so on and is fully acceptable as a progressive multifocal lens for various purposes.

It will thus be seen that the objects set forth above, and those made apparent from the preceding description. are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A progressive multifocal ophthalmic lens comprising first and second refractive surfaces facing each other, said first refractive surface having upper and lower portions and including a far vision viewing zone in said upper portion for viewing mainly distant objects, a near vision viewing zone in said lower portion for viewing mainly nearby objects, and an intermediate vision viewing zone for viewing mainly intermediate objects between said far and near vision viewing zones, said intermediate vision viewing zone having an intermediate vision viewing zone central portion and said near vision viewing zone having a near vision viewing zone central portion, said first refractive surface having a principal meridian curve extending vertically in the general center of said far, intermediate and near vision viewing zones, the surface power along said principal meridian curve in said intermediate vision viewing zone progressively increasing from a far vision viewing zone reference focal power (D1 diopter) to a near vision viewing zone reference focal power (D2 diopter), and an additional power Ad [Ad=D2−D1] of said first refractive surface being about 1.5 diopter or more, said intermediate vision viewing zone central portion and said near vision viewing zone central portion extending on opposite sides of said principal meridian curve, the principal curvatures at each arbitrary point on said first refractive surface being C1 and C2, each point on said first refractive surface in said intermediate vision viewing zone central portion satisfying the condition:

$$|C1-C2| \leq 1/(N-1) \ (m^{-1}),$$

wherein $m^{-1}=1/$meters, and each point on said first refractive surface in said near vision viewing zone central portion satisfying the conditions:

$$|C_1 - C_2| \leq 1/(N-1)(m^{-1})$$

$$\frac{D_2 - 0.5}{N - 1} \leq \frac{C_1 + C_2}{2} \leq \frac{D_2 + 0.5}{N - 1} \ (m^{-1}),$$

where N is the refractive index of the lens material, the minimum width of said intermediate vision viewing zone central portion and the maximum width of said near vision viewing zone central portion being S(mm) and W(mm), respectively, said minimum width S and said maximum width W satisfying the conditions:

$$W \leq 30/A \text{ (mm)}$$

$$W \leq 1.5 \times S \text{ (mm)},$$

where A is the value of the additional power Ad expressed in units of diopter, and the gradient of the variation of the surface power at each arbitrary point along said principal meridian curve is G(diopter/mm), every point along said principal meridian curve in said intermediate vision viewing zone satisfying the condition:

$$G \leq Ad/18 \text{ (diopter/mm)},$$

where Ad is the additional power in units of diopter.

2. The progressive multifocal ophthalmic lens as claimed in claim 1, wherein said first refractive surface includes a fitting point, each point on said first refractive surface above a straight line starting at the fitting point and extending downward to both sides thereof by about an angle of K degree from the horizontal line of said lens when said lens is glazed, satisfying the conditions:

$$|C_1 - C_2| \leq 1/(N - 1)(m^{-1})$$

$$\frac{D_2 - 0.5}{N - 1} \leq \frac{C_1 + C_2}{2} \leq \frac{D_2 + 0.5}{N - 1} \ (m^{-1}),$$

where K is the calculation of the formula:

$$K = 50 - A \times 20,$$

in which A is the value of the additional power Ad expressed in units of diopter.

3. The progressive multifocal ophthalmic lens as claimed in claim 1, wherein the surface power along said principal meridian curve is constant in said far vision viewing zone and in said near vision viewing zone, and in said intermediate viewing zone, the angle formed by the normal line at each point along the intersection of a plane in parallel with said principal meridian curve and said first refractive surface and a plane containing said principal meridian curve changes in the same manner as the change of the surface power along said principal meridian curve in said intermediate vision viewing zone.

4. The progressive multifocal ophthalmic lens as claimed in claim 3, wherein the surface power along the intersection of a plane orthogonal to said principal meridian curve on said first refractive surface, into the direction away from said principal meridian curve, in said far vision viewing zone, is constant for a predetermined distance from said principal meridian curve, then progressively increases for the predetermined distance and then progressively decreases, and in said near vision viewing zone, is constant for a certain distance, then progressively decreases for the predetermined distance, and then progressively increases.

5. The progressive multifocal ophthalmic lens as claimed in claim 1, wherein said first refractive surface is divided into a nose-side segment and a temple-side segment by a principal gazing line extending from the far vision viewing zone to the near vision viewing zone, and in said intermediate vision viewing zone and said near vision viewing zone, the horizontal and the vertical differences in the distortion between said nose-side segment and said temple-side segment are less than the tolerance in humans.

6. The progressive multifocal ophthalmic lens as claimed in claim 1, wherein said first refractive surface includes an umbilical curve extending vertically in the general center of said first refractive surface and said first refractive surface further includes a section of said first refractive surface taken along a plane orthogonal to said umbilical curve between the optical center of the far vision viewing zone and the near vision viewing zone, said section being of substantially circular shape with a value of radius of curvature equal to that of radius of curvature of said umbilical curve at the point of intersection of said umbilical curve with said section of substantially circular shape, and dividing said first refractive surface into the upper portion in which sections taken along a plane orthogonal to said umbilical curve have the value of radius of curvature decreasing into the direction away from said umbilical curve and the lower portion in which sections have the value of radius of curvature increasing into the direction away from said umbilical curve.

7. The progressive multifocal ophthalmic lens as claimed in claim 1, wherein in the portion outside a point about 20 to 25 mm apart from said principal meridian curve, the principal axes of the principal curvatures at each point of said first refractive surface lie in a vertical direction and a horizontal direction.

8. The progressive multifocal ophthalmic lens as claimed in claim 2, wherein the surface power along said principal meridian curve is constant in said far vision viewing zone and in said near vision viewing zone, and in said intermediate viewing zone, the angle formed by the normal line at each point along the intersection of a plane in parallel with said principal meridian curve and said first refractive surface and a plane containing said principal meridian curve changes in the same manner as the change of the surface power along said principal meridian curve in said intermediate vision viewing zone.

9. The progressive multifocal ophthalmic lens as claimed in claim 8, wherein the surface power along the intersection of a plane orthogonal to said principal meridian curve on said first refractive surface, into the direction away from said principal meridian curve, in said far vision viewing zone, is constant for a predetermined distance from said principal meridian curve, then progressively increases for the predetermined distance and then progressively decreases, and in said near vision viewing zone, is constant for a certain distance, then progressively decreases for the predetermined distance, and then progressively increases.

10. The progressive multifocal ophthalmic lens as claimed in claim 2, wherein said first refractive surface is divided into a nose-side segment and a temple-side segment by a principal gazing line extending from the far vision viewing zone to the near vision viewing zone, and in said intermediate vision viewing zone and said near vision viewing zone, the horizontal and the vertical differences in the distortion between said nose-side segment and said temple-side segment are less than the tolerance in humans.

11. The progressive multifocal ophthalmic lens as claimed in claim 2, wherein said first refractive surface includes an umbilical curve extending vertically in the general center of said first refractive surface and said first refractive surface further includes a section of said first refractive surface taken along a plane orthogonal to said umbilical curve between the optical center of the far vision viewing zone and the near vision viewing zone, said section being of substantially circular shape with a value of radius of curvature equal to that of radius of curvature of said umbilical curve at the point of intersection of said umbilical curve with said section of substantially circular shape, and dividing said first refractive surface into the upper portion in which sections taken along a plane orthogonal to said umbilical curve have the valve of radius of curvature decreasing into the direction away from said umbilical curve and the lower portion in which sections have the value of radius of curvature increasing into the direction away from said umbilical curve.

12. The progressive multifocal ophthalmic lens as claimed in claim 2, wherein in the portion outside a point about 20 to 25 mm apart from said principal meridian curve, the principal axes of the principal curvatures at each point of said first refractive surface lie in a vertical direction and a horizontal direction.

* * * * *